United States Patent [19]

Matovich, Jr.

[11] 4,055,956
[45] Nov. 1, 1977

[54] HIGH TORQUE SOLAR MOTOR

[76] Inventor: Mitchel J. Matovich, Jr., 19354 Zinfandel Court, Saratoga, Calif. 95070

[21] Appl. No.: 739,607

[22] Filed: Nov. 8, 1976

Related U.S. Application Data

[63] Continuation-in-part of Ser. No. 639,845, Dec. 11, 1975, abandoned.

[51] Int. Cl.$^2$ ............................................. F03G 7/02
[52] U.S. Cl. ................................... 60/527; 60/641
[58] Field of Search ..................... 60/527, 529, 641

[56] References Cited

U.S. PATENT DOCUMENTS

| 534,871 | 2/1895 | French | 60/527 |
| 824,474 | 6/1906 | French | 60/527 |
| 3,630,020 | 12/1971 | Chase et al. | 60/529 |
| 3,754,151 | 8/1973 | Clark | 60/527 X |
| 3,772,876 | 11/1973 | Slysh | 60/529 |
| 3,913,326 | 10/1975 | Banks | 60/527 |

FOREIGN PATENT DOCUMENTS

| 307,596 | 3/1929 | United Kingdom | 60/529 |
| 27,731 | 12/1903 | United Kingdom | 60/527 |
| 225,620 | 8/1968 | U.S.S.R. | 60/527 |

OTHER PUBLICATIONS

Institution of the Rubber Industry pp. 162–167, vol. 1, Apr. 26, 1934.

Primary Examiner—Irwin C. Cohen

Attorney, Agent, or Firm—Thomas H. Olson

[57] ABSTRACT

A frame having two or more thin elongate vanes mounted thereon and a shaft for supporting the frame for rotation so that each of the two opposite surfaces of the vanes is sequentially exposed to heat energy from the sun or the like. One surface is an absorbtive surface, exposure of which effects heating and expansion of the vane. The other surface is reflective surface, exposure of which permits cooling and contraction of the vane. When the vane contracts, the contraction sets up substantial tensile forces within the vane, and the invention includes a linkage interlinking the vane and the shaft so that the tensile force is converted to rotative force to sustain rotation of the frame. The frame has a power takeoff so that useful work is produced.

Two mechanisms for interlinking the tensile force in the vanes to rotative motion are disclosed. One mechanism includes a spring which urges the vane to a deflected condition and when the vane contracts during cooling the tensile force is transmitted through a gear train to store energy in the spring and to effect rotation through a first overrunning clutch mechanism. When the vane heats and expands due to exposure to solar energy, the vane expands and the spring moves the linkage in the opposite direction, such movement being coupled to the shaft through a second overrunning clutch of opposite orientation to the first one. The second mechanism converts the tensile force in the vane through a lever to a roller and cam arrangement which produces rotary movement.

10 Claims, 8 Drawing Figures

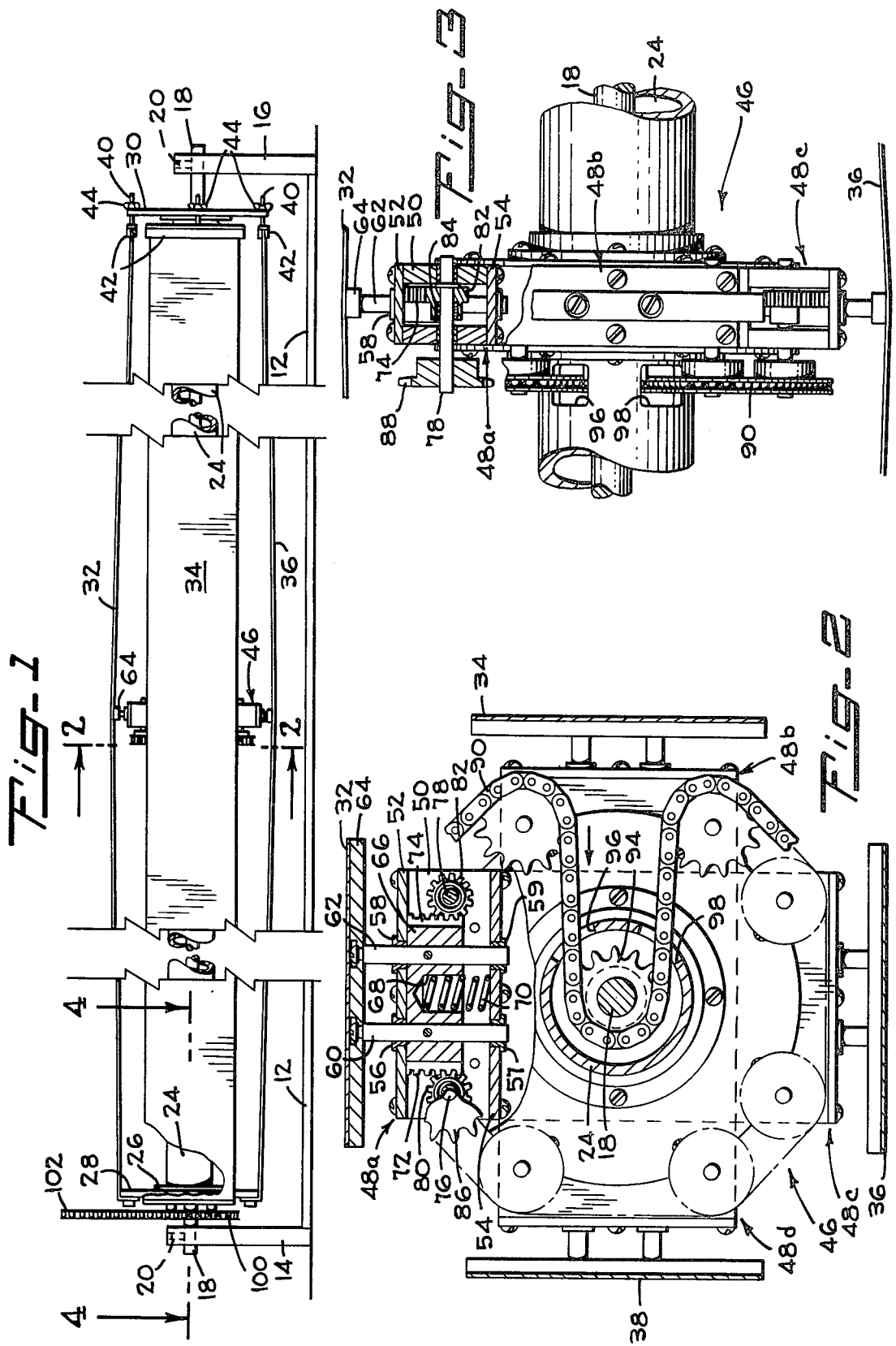

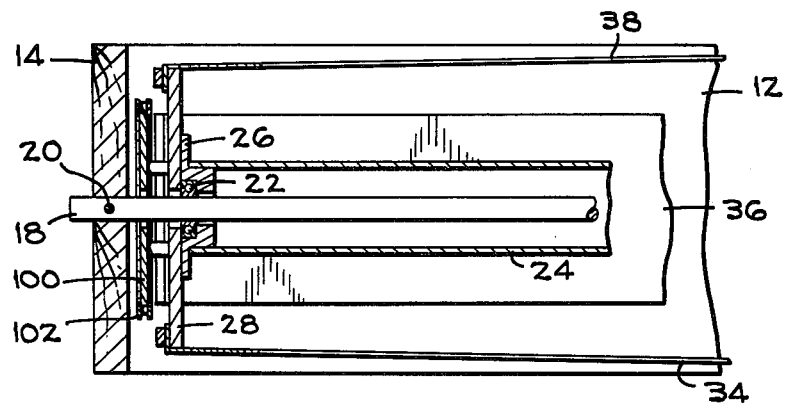
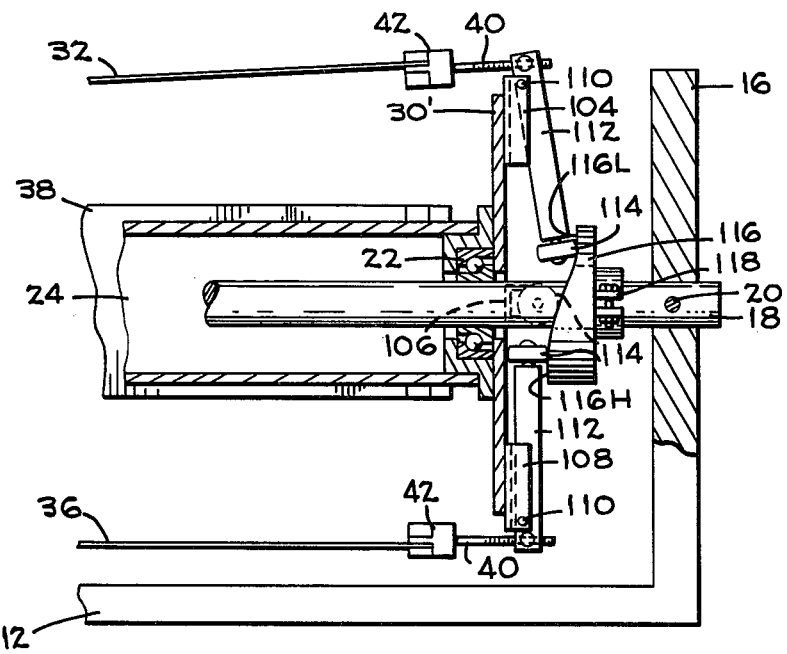

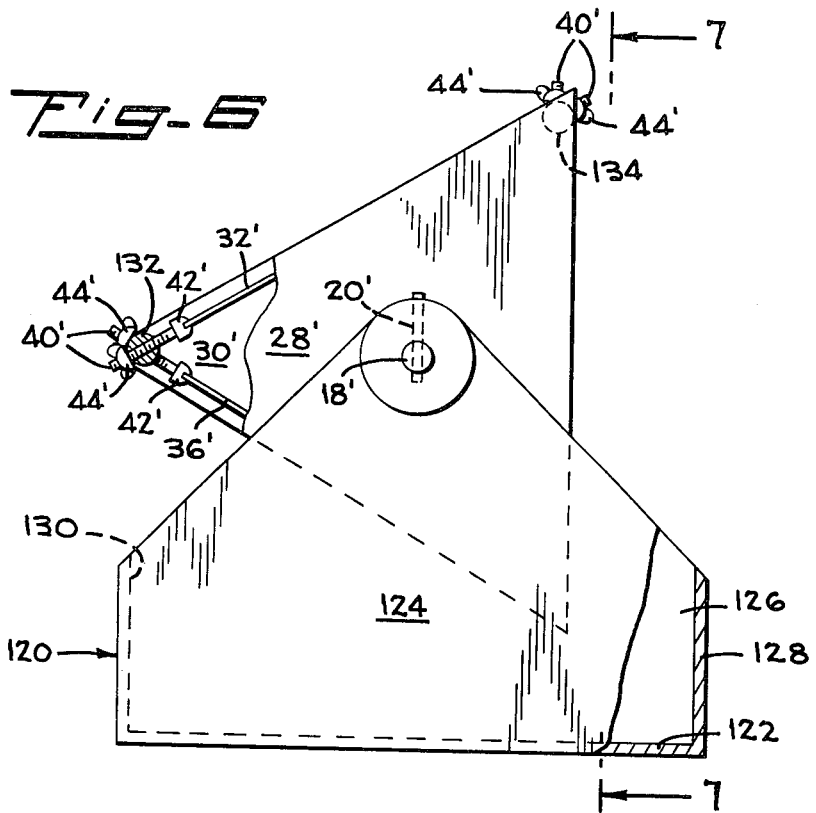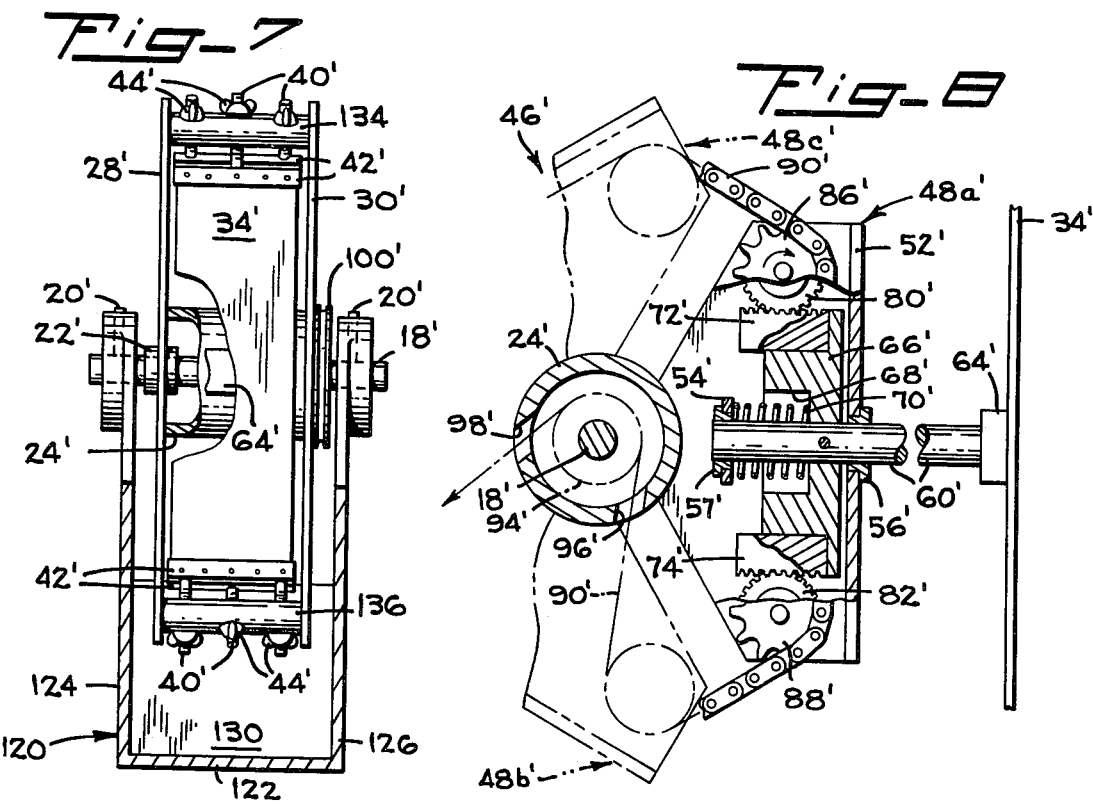

HIGH TORQUE SOLAR MOTOR

CROSS-REFERENCE TO RELATED APPLICATION

This is a continuation-in-part of U.S. application Ser. No. 639,845, filed Dec. 11, 1975 and now abandoned.

BACKGROUND OF THE INVENTION

1. Field of the Invention

This invention relates to a solar motor and more particularly to a solar motor that exploits the large tensile forces produced in certain materials in response to cooling and contraction of such materials.

2. Description of the Prior Art

U.S. Pat. No. 348,841 and 1,260,300 disclose devices wherein a plurality of metal rods are series connected so as to produce power in response to ambient temperature variations throughout the day and night. Such devices can produce only a small amount of movement over an extremely long time.

U.S. Pat. No. 824,474 discloses a pyromotor which employs leaf springs which are heated by a flame source to expand and contract. There is a ratchet and pawl mechanism for transmitting the expansion and contraction forces on the leaf springs to a shaft and a fly wheel mounted thereon.

U.S. Pat. No. 1,393,376 discloses a device having a plurality of thermal strips and a mechanism moveable over the strips for alternately shading the strips and exposing the strips to sunlight. The strips are substantially stationary, one end of each strip being connected to a ratchet and pawl mechanism to impart rotative motion to a shaft.

U.S. Pat. No. 3,754,151 discloses a heavy balanced structure freely supported on a shaft. On opposite sides of the structure are supported heat sensitive bands. When one of the bands is exposed to heat energy and the other band is shaded from heat energy, the supporting structure is deformed into an asymmetrical or unbalanced condition so as to cause rotation of the structure on the shaft in response to the force of gravity. The device disclosed in the '151 patent is capable of producing a force limited to the magnitude of the force of gravity acting on the unbalanced weight of the structure.

SUMMARY OF THE INVENTION

According to the present invention one or more thin elongate vanes of aluminum or like material preferably having a high thermal coefficient of expansion and contraction are supported on a rotatable frame so that when the frame rotates, the respective surfaces of the vanes are alternately exposed to solar energy. One surface of the vane is coated with heat absorbent material, and when the surface is exposed to solar energy, the vane will expand. The other vane surface is a heat reflective surface, which when exposed to solar energy causes the vane to contract. When the vane contracts, an extremely high tensile force is produced in the vane, and the invention provides a linkage for converting such tensile force, which is directed axially of the vane, to a rotative force which acts on a shaft so as to maintain rotation of the frame. Because the frame is well balanced, very little of the energy arising from the tensile force in the vanes is needed to maintain rotation of the frame so that a substantial amount of energy is available to perform useful work.

It is an object of the invention to provide a solar motor that is capable of high torque outputs. This object is achieved according to the present invention by linking the extremely high tensile forces developed in the vanes to a shaft. Achievement of this object is to be contrasted with certain of the above described prior art devices wherein the torque is limited by the weight of the rotating parts of the device.

Another object of the invention is to provide a solar motor capable of relatively high RPM operation. Achievement of this object is made possible by so proportioning the vanes that they are capable of producing high tensile forces but are configured so as to quickly radiate heat energy when the heat absorbtie surface moves into a shaded position in response to rotation of the frame.

Another object of the invention is to provide a solar motor of the type described above that is capable of delivering torque during both expansion of the vane due to heating and contraction of the vane due to cooling. For accomplishing this object the invention includes in one embodiment a spring associated with each vane and mechanism for storing energy in the spring as the vane contracts due to cooling. The energy stored in the spring is utilized during expansion of the vane due to heating. A plurality of similar mechanisms can be mounted around the vane supporting frame so that the torque output is substantially constant throughout all rotative positions of the frame.

In another embodiment the vanes are arranged in opposing coacting pairs, and a novel camming arrangement effects balance between an expanding vane and a contracting vane and converts the tensile force produced upon cooling of the vane to a rotative force.

A further object is to provide a solar motor capable of producing substantially constant torque throughout full 360° rotation thereof. This object is achieved because the invention can accommodate four, six or more vanes uniformly spaced therearound in such a way that at least one vane is delivering torque at all times.

The foregoing together with other objects, features and advantages of the invention will be more apparent after referring to the following specification and the accompanying drawings.

BRIEF DESCRIPTION OF THE DRAWINGS

FIG. 1 is an elevation view of one embodiment of the invention with portions being broken away to reveal internal details.

FIG. 2 is a cross-sectional view taken on a plane designated by line 2—2 of FIG. 1 and being at enlarged scale.

FIG. 3 is a side view of the mechanism of FIG. 2 with portions being broken away to reveal internal details.

FIG. 4 is a fragmentary plan view in cross section taken on a plane designated by line 4—4 of FIG. 1.

FIG. 5 is a fragmentary elevation view showing a modification of the invention.

FIG. 6 is a side elevation view of another embodiment of the invention with portions being broken away to reveal internal details.

FIG. 7 is a view taken along the plane designated by line 7—7 of FIG. 6.

FIG. 8 is an enlarged fragmentary view showing the details of the central axle of the embodiment shown in FIGS. 6 and 7.

DETAILED DESCRIPTION OF THE PREFERRED EMBODIMENTS

Referring more particularly to the drawings and to the embodiment shown in FIGS. 1-4, reference numeral 12 indicates an elongate base from opposite ends of which extend vertical stanchions 14 and 16. Stanchions 14 and 16 support therebetween a shaft 18 which is pinned at 20 to lock the shaft against rotation relative base 12. Supported for rotation on shaft 18 by means of bearings 22 is a rigid frame composed of an elongate tubular member 24 which is supported in coaxial relationship to shaft 20 by means of rigid end fixtures 26. Rigidly secured to the respective end fixtures 26 are polygonal plates 28 and 30. In the embodiment shown in FIGS. 1-4 plates 28 and 30 are of generally square shape because there are four vanes in such embodiment. Secured to polygonal plate 28 are the ends of four substantially identical vanes 32, 34, 36 and 38; the vanes are uniformly spaced around the rotatable structure formed by tubular member 24 and plates 28 and 30.

Vanes 32-38 are substantially identical to one another. In one exemplary structure designed according to the invention, the vanes are formed of aluminum or an alloy of aluminum having a thickness of 0.005 inches, more or less, a width of about six inches and a length of 6-7 feet. One surface of the vanes, preferably the outer surface, is provided with a coating of black material or similar material that enhances the rate of heat absorption by and radiation from the vanes. The other surface of the vanes, preferably the inner surface, is coated with a heat reflective material or, in the case of aluminum, is maintained in a highly polished state. The thinness of the vanes and the presence of the reflective surface thereon permits the vanes to cool and contract when shaded from solar heat energy in approximately 5-10 seconds. The above mentioned exemplary length and width of the vanes is not limiting, but merely exemplifies a structure of convenient size. As will appear from the following discussion, vanes of virtually any length and width can be provided within the scope of the invention.

As seen in somewhat exaggerated scale in FIG. 1, vane 32 deflects from a straight line position when the heat absorbtive surface thereof is exposed to sunlight. The vanes contract to a more nearly straight line position when the heat absorbtive surface is shaded from the solar energy, which occurs when the heat reflective surface is exposed to solar energy or when a given vane is shaded by one or more other vanes. For initially tensioning the vanes, the specific amount of tension depending on the ambient temperature conditions and the dimensional relationships of the apparatus, there are at the end of the structure adjacent polygonal plate 30 tension bolts 40 which are fixed to the ends of the vanes by bars 42 which have a width substantially coextensive with that of the vanes. Bolts 40 pass through appropriately spaced holes in polygonal end plate 30; wing nuts 44 are engaged with the bolts on the outer side of the end plate. Adjustment of the wing nuts permits adjustment of the initial tensioning of the vanes.

As the frame which carries the vanes rotates, the surfaces of the vanes are alternately and sequentially exposed to solar heat energy. This causes the vanes alternately to absorb and to radiate heat energy which in turn causes the vanes alternately to expand and contract. The expansion and contraction is converted to rotary mechanical movement by an interlinking mechanism 46 shown in detail in FIGS. 2 and 3.

Interlinking mechanism 46 is located midway between stanchions 14 and 16, the location at which the radial excursion of the vanes between the expanded condition and the contracted position is maximum. The interlinking mechanism is supported on frame segments 48a, 48b, 48c and 48d which are rigid with and rotatable with tubular member 24. The interlinking mechanism includes an individual subassembly associated with each vane; because the respective subassemblies are substantially identical, the description of one which follows can be considered exemplary of all.

Referring to FIG. 2 each subassembly is supported on a rectangular support plate 50 that constitutes a part of frame segment 48a. Extending in a direction parallel to the axis of shaft 18 are an outer plate 52 and an inner plate 54. Plates 52 and 54 support a first bushing pair 56 and 57, and a second bushing pair 58 and 59. The bushing pairs respectively support rods 60 and 62 for movement in a generally radial (to shaft 18) direction. The outer ends of rods 60 and 62 are rigidly secured to a pressure bar 64 which has a length corresponding to the width of the vane so that the force applied across the width of the pressure bar by the vane is uniform. Pinned to rods 60 and 62 between plates 52 and 54 is a block 66. The block defines an inward opening bore 68 in which a compression spring 70 is disposed, the opposite end of a compression spring 70 bearing against the outer surface of inner plate 54. Accordingly, pressure bar 64 and the vane associated therewith are biased outward, i.e., into a non-linear condition.

Formed on the opposite lateral surfaces of block 66 are gear racks 72 and 74 which move with the block. In spaced relation to the respective gear racks are shafts 76 and 78, the shafts supporting respective pinions 80 and 82 in meshing relation with the respective gear racks 72 and 74. The pinions are engaged with the respective shafts through properly oriented overrunning clutches, one such clutch being shown in FIG. 3 as including a clutch spring 84. The overrunning clutch mechanism, per se, is old. As is well known by those skilled in the art, rotation of pinion 82 in one rotative direction tends to unwind spring 84 so that no torque is applied to shaft 78. In the opposite direction of rotation of the pinion, the spring 84 is wound up so that it frictionally engages shaft 78 and imparts torque thereto. Secured to each of shafts 76 and 78 is a sprocket 86 and 88 respectively. The sprockets are fixed to the respective shafts so that they rotate when the shafts are rotated.

The overrunning clutches associated with pinions 80 and 82 are oriented so that sprockets 86 and 88 are rotatively driven in a common direction in response to radial reciprocation of block 66. For example, inward movement of block 66 in response to cooling and contraction of vane 32 will rotate pinion 80 in a clockwise direction and pinion 82 in a counterclockwise direction. The overrunning clutches associated with the respective pinions are arranged so that the clockwise rotation of pinion 80 is transmitted to corresponding rotation of shaft 76 and sprocket 86 secured thereto. Pinion 82 is rotated in a counterclockwise direction by inward movement of block 66, and the overrunning clutch associated with pinion 82 is arranged to overrun in such direction so that no torque is applied to shaft 78. When vane 34 is exposed to solar heat, the vane expands to permit block 66 to move outward in response to the force of spring 70. Outward movement of block 66 rotates pinion 80 in a counterclockwise direction, a direction in which the pinion overruns shaft 76 so as not to apply torque to sprocket 86. Simultaneously, pinion 82 is rotated in a clockwise direction, the overrunning clutch associated therewith being oriented so as to transmit torque to sprocket 88. Accordingly, both sprockets are rotated solely in a clockwise direction irrespective of the direction of movement of block 66.

A roller chain 90 shown fragmentarily in FIG. 2 is engaged with both sprockets and therefore moves in the direction indicated by the arrow at all times. Roller chain 90 is also trained around the other sprockets associated with the other three subassemblies on frame segments 48b, 48c and 48d, the overrunning clutches in the other subassemblies being similarly oriented so that all force applied to the chain is in a single direction. In the same plane as the sprockets 86 and 88 and their counterparts in the other subassemblies is a central sprocket 94 which is fixed to shaft 18. Tubular member 24 is provided with openings 96 and 98 to permit the chain to pass through the wall of the tubular member and engage the central sprocket. Accordingly, as the vanes 32-38 expand and contract and their respective pressure bars reciprocate radially, force is applied to chain 90 which through engagement with central sprocket 94 effects rotation of the vanes and the structure supporting the vanes. The parts of the rotating apparatus are well balanced, in consequence of which very little power is expended in rotatively driving the frame. Because the vanes produce substantial force on contraction during cooling, substantial power can be taken from the rotating structure through a sprocket 100 secured to polygonal end plate 28 and a chain 102 engaged between such sprocket and a load (not shown).

In operation it can be assumed that the apparatus of FIGS. 1-4 would normally be oriented with the longitudinal dimension thereof extending in a north-south direction. Moreover, the structure can be tilted by elevating one end thereof by an amount that depends on the time of year during which the device is operated in order to maximize the radiant heat energy impinging on the vanes. If it is assumed that, as viewed in FIG. 1, the sun is directly above vane 32, the heat absorbtive surface of such vane will absorb heat energy and the vane will expand. Simultaneously, vane 36 will either be shaded by vane 32 or will receive solar energy on its reflective surface, in consequence of which vane 36 will cool and contract. Contraction of vane 36 will move the pressure bar and block associated therewith inward and store energy in spring 70. During such inward movement of vane 36, one of the pinions associated therewith transmits torque to its corresponding sprocket through the overrunning clutch mechanism therebetween. As the spring associated with expanding vane 32 moves the mechanism associated with that vane outward, rotation of one of the sprockets associated therewith will occur and in the same direction. Accordingly, the entire frame will be rotated to move vane 32 toward a shaded position or to a position at which a heat reflective surface is exposed to the sun's rays. Concurrently vane 38 moves into a position for full exposure to the solar heat energy on its heat absorbtive surface. Such procedure continues with each of the vanes in turn supplying significant torque to maintain rotation of the structure. Because the structure is well balanced, it requires very little power to maintain such rotation so that substantial power can be taken from chain 102. The motor of the invention revolves at a relatively slow rate, e.g., 6-10 RPM but the torque due to the contraction of the vanes is of such magnitude that it will drive speed changing gearing connected to chain 102 so as to produce useful output, e.g., to operate a water pump or the like.

In the modification of FIG. 5, parts identical to those described hereinabove in connection with the embodiment of FIGS. 1-4 will be employed. Thus, there is a base plate 12 from opposite ends of which extend vertical stanchions, one stanchion 16 being shown in the drawing. Shaft 18 is pinned to the stanchion at 20 so that the shaft is stationary. Rigid tubular member 24 is supported by a bearing 22 for rotation on the shaft and has polygonal end plates one of which is shown at 30'. Rigid with polygonal plate 30' are four fulcrum blocks spaced on quadrature around the plate, three such blocks being indicated at 104, 106 and 108. Each block supports a pin 110 which forms the pivot axis or fulcrum for a lever 112. To the outer end of each lever 112 is secured a bolt 40 associated with each vane. At the inner extremity of each lever is a cam roller 114, the cam rollers contacting a circular cam 116. Cam 116 is rigidly but adjustably fixed to shaft 18 via a clamp 118 so that the rotative orientation of the cam can be adjusted to optimize operation of the device. The cam has a low region 116L and a high region 116H which is spaced approximately 180° from the low region. The surface regions of the cam intermediate regions 116L and 116H are smooth transition regions between the two extremes.

The operation of the embodiment of FIG. 5 can be understood by assuming that vane 36 is going through a cooling phase either by being shaded by the other vanes or by being oriented so that the inner, heat reflective surface is exposed to the sun's rays. In such cooling phase vane 36 is contracting. Through the lever 112 associated with vane 36, roller 14 applies a substantial force on cam region 116H, such force being generally directed rightward of FIG. 5. Because cam 116 is firmly fixed to shaft 18, such force is directed in a rotative direction because the roller tends to roll "downhill" from cam surface portion 116H toward cam surface portion 116L. Such force rotates the frame and brings the succeeding vane from a position at which the outer, heat absorbtive surface is exposed to solar energy into a lower position at which the heat reflective surface of the vane is exposed to solar energy so that the same force is produced by such succeeding vane. Accordingly, the frame is rotated and useful power is thereby generated.

FIGS. 6-8 illustrate another form of the invention wherein the vanes are oriented transversely to the axis of rotation rather than parallel thereto as in the above described embodiments. In the embodiment of FIGS. 6-8 reference numeral 120 indicates generally a support frame for the apparatus. Frame 120 includes a base plate 122 from the edges of which extend upward side plates 124 and 126. End plates 128 and 130 support side plates 124 and 126 in parallel upstanding relationship so as to impart substantial rigidity and strength to frame 120.

Because of substantial functional similarities between the interlinking mechanism of FIG. 8 and that of FIG. 2, the description of FIG. 8 will employ the same reference numerals for similar elements as employed in FIG. 2 with the addition of a prime in each case.

Spanning the space between side plate 124 and 128 adjacent the upper extremity thereof is a shaft 18' which is fixed to the frame against rotation, such as by a pin 20'. Identical triangular frame members 28' and 30' are journaled for rotation on shaft 18' by suitable means such as bushings one of which is indicated at 22'. For fixing triangular plates 28' and 30' to one another in a rigid rotatable structure there is a central tubular support 24' which is disposed in coaxial relationship to shaft 18' and rotatable relative thereto. Spanning the spaces between the vertices of triangular side plates 28' and 30' are structural rods 132, 134 and 136 respectively. The rods are diametrically bored to receive therethrough tension screws 40' the inner ends of which are attached to rigid ribs 42'. Pinned to associated pairs of ribs 42' are vanes 32', 34' and 36'. Vanes 32', 34' and 36' are constructed of the same material of approximately the same dimensions as has been described hereinabove. Each vane has an outer heat absorbtive surface and an inner heat reflective surface. The protruding portions of tension screws 40' are provided with wing nuts 44' so as to afford initial tensioning of the vanes 32'-36' to accommodate ambient conditions and the like. Mid span of each vane is a pressure bar 64' which is supported at the outer ends radially extending operating rods, one rod being shown at 60'.

There are three identical frame segments 48a', 48b' and 48c' secured to tubular support member 24'. Because the frame segments and the interlinking subassemblies supported on the respective segments are identical, only one, segment 48a', will be described. The frame segment includes an outer plate 52' which supports a bushing 56' to guide a rod 60' for movement on a radially extending axis. Frame segment 48a' also carries an inner plate 54' which supports a bushing 57' to constrain the inner end of rod 60' for such radial movement. Pinned to operating rod 60' for movement in unison therewith is a block 66'. The block defines a bore 68' in which is disposed a compression spring 70' which biases rod 60' and pressure bar 64' in a radial outward direction. Block 66' supports gear racks 72' and 74', the gear racks moving in unison with block 66', rod 60' and pressure bar 64'. Supported for rotation on frame segment 48a' for meshing with respective gear rack 72' and 74' are pinions 80' and 82'. Secured to the respective pinions for one-way rotation therewith are sprockets 86' and 88', the overrunning clutches (not shown) that interconnect the respective sprockets and pinions being of any suitable form, such as that described hereinabove in connection with FIG. 3. The overrunning clutches are oriented so as to establish a driving connection between pinion 80' and sprocket 86' when block 66' moves in one radial direction and to establish a driving connection between pinion 82' and sprocket 88' when the sub-frame moves in the opposite radial direction. Accordingly, a roller chain 90' which is engaged with sprockets 86' and 88' is driven in a single direction irrespective of whether rod 60' moves inward in response to cooling and contraction of vane 34' or outward in response to the force of spring 70' during heating and expansion of the vane.

Tubular support 24' is formed with two strategically located openings 96' and 98' to admit chain 90' interior thereof for engagement with a sprocket 94' which is fixed to shaft 18'. Accordingly, in response to sequential heating and cooling of vanes 32'-36' by alternate exposure of the heat absorbtive surface and the heat reflective surface, the entire structure including tubular support 24', the vanes and triangular plates 28' and 30' are rotated relative base 120 and shaft 18'. Power can be taken off the apparatus by any suitable means such as by means of a sheave or pulley 100' fixed to the exterior surface of triangular side plate 30'.

Although the embodiments of the invention described in detail hereinabove employ either four or three vanes, it should be apparent that one or any reasonable number of vanes can be employed. Irrespective of the number of vanes each vane is provided with a heat absorbtive surface and a heat reflective surface, and is supported to afford alternating exposure of the surfaces to solar energy. In structures employing two or more vanes it is preferable that the vanes be of uniform size and material and that they be supported uniformly around the rotating frame.

Because of the substantial surface area of the vanes that is exposed to solar energy, because of the different character of opposite vane surfaces, and because of the relative thinness of the material of which the vanes is constructed, substantial torque can be produced by the apparatus. Moreover, the large surface area affords efficient energy utilization throughout the day without the necessity for altering the position of the frame of the apparatus. Finally the relatively open construction interior of the vanes assures free air circulation which in turn shortens the time necessary for the vanes to cool and contract when they are moved into a shaded position or into a position at which the inner heat reflective surface is exposed to the sun's rays.

Thus it will be seen that the invention provides an extremely efficient solar motor that is capable of extremely high torque production. In addition to operating efficiently throughout the entire day, the moving parts of the apparatus are relatively straightforward, rugged and long lasting so that motors employing the invention can be placed in remote locations where maintenance is infrequent. Although several embodiments of the invention have been shown and described it will be obvious that other adaptations and modifications can be made without departing from the true spirit and scope of the invention.

What is claimed is:

1. A motor for converting to mechanical energy heat energy which radiates from a source and travels along a path, said motor comprising a base, a non-rotatable shaft secured to said base for defining an axis of rotation oriented transversely of said path, a rigid frame and means for supporting said frame for rotation on said shaft, first and second thin elongate vanes having ends rigidly fixed to said frame, said vanes being supported at circumferentially spaced points on said frame, each said vane having a heat energy absorbtive surface and an oppositely disposed heat energy reflective surface so that in response to rotation of said frame on said shaft the respective said surfaces of each said vane alternately and sequentially move through an exposed position at which the vane surfaces are exposed to said source, said vanes being formed of material having a thermal coefficient of expansion and contraction so that upon movement of the absorbtive surfaces of respective said vanes to a position nonexposed to said source said vanes contract to produce a tensile force, means interlinking said vanes at a site substantially medially of said ends and said shaft for converting said tensile force to a rotational force on said frame, and output means connected to said frame.

2. A motor according to claim 1 wherein said force converting means comprises first and second rigid arms, means for operatively connecting said rigid arms to respective said vanes, and means for constraining said rigid arms for reciprocating movement in response to expansion and contraction of said vanes during sequential movement of said vane surfaces to alternate exposure and nonexposure to said source.

3. A motor according to claim 2 wherein said constraining means comprises first and second frame segments rigid with said frame and intermediate said vanes, first and second bushing pairs mounted on respective said segments for supporting respective said rigid arms for axial movement in a direction radially of said shaft, said operatively connecting means including first and second pressure bars fixed to the outer ends of respective said arms, said pressure bars having a length corresponding to the width of respective said vanes and bearing against respective said vanes intermediate the ends thereof, said force converting means including a gear train for converting axial movement of said rigid arms to rotational movement.

4. A motor according to claim 3 wherein said gear train includes a gear rack rigid with said first arm for movement therewith toward and away from said shaft, a pinion and means for rotatively supporting said pinion in meshing relation with said gear rack so that said pinion is rotated in one direction in response to inward movement of said arm and in an opposite direction in response to outward movement of said arm, a drive train operatively connected to said shaft, and means including an overrunning clutch for imparting torque from said pinion to said drive train only in a direction of rotation of said pinion corresponding to inward movement of said arm.

5. A motor according to claim 4 wherein said drive train includes a first sprocket fixed to said shaft, a second sprocket mounted coaxially with said pinion, and a chain trained around said first and second sprocket.

6. A motor according to claim 4 including means for resiliently biasing said arm outward to afford outward movement of said arm in response to heating and expansion of said vane.

7. A motor according to claim 6 in combination with a second gear rack rigid with said arm, a second pinion meshed with said second gear rack, and second overrunning clutch means linking said second pinion with said drive train so that said second pinion drives said gear train in the same rotative direction in response to outward movement of said arm.

8. A motor according to claim 1 wherein the longitudinal axes of said vanes are substantially parallel to said shaft.

9. A motor according to claim 1 wherein the longitudinal axes of said vanes are substantially perpendicular and tangential to said shaft.

10. A motor for converting to mechanical energy heat energy which radiates from a source and travels along a path, said motor comprising a base, a non-rotatable shaft secured to said base for defining an axis of rotation oriented transversely of said path, a rigid frame journaled for rotation on said shaft, first and second thin elongate vanes each having first and second opposite surfaces and means for rigidly fixedly mounting the ends of said vanes in circumferentially spaced apart sites on said rigid frame so as alternately to expose said surfaces of respective said vanes to heat energy in response to rotation of said frame, said mounting means mounting said vanes so that said first surfaces are radially outward of said second surface, said first surfaces being heat energy absorbtive surfaces and said second surface being heat energy reflective surfaces, said mounting means supporting said vanes so that upon movement of respective said vanes to a position at which said first surface is unexposed to said source said vane contracts to produce a substantial tensile force therein, first and second means associated with respective said vanes for directly converting said tensile force to a rotational force on said frame relative to said shaft, each said force converting means having a rigid rod supported in said frame for movement radially of said axis of rotation at a site medially of said vane ends, a pressure bar secured to the outer end of said rod for bearing upon the second surface of the associated vane, means for resiliently biasing said rod outward so that said pressure bar maintains continuous contact with said second vane surface, a gear rack rigid with said rod inward of said pressure bar, a pinion journalled in said frame so as to mesh with said rack and to rotate in response to radial movement of said rod, means including an overrunning clutch for operatively connecting rotation of said pinion in response only to inward movement of said rod to said shaft to effect rotation of said frame and said vanes thereby to expose said vane surfaces alternately to said source, said biasing means maintaining tension in said vane upon movement thereof to the expanded position in response to exposure of said first surface to said source and output means connected to said frame.

* * * * *